March 1, 1960 — J. P. LAWLOR ET AL — 2,926,856
VARIABLE FLOW REACTOR
Filed Dec. 5, 1958

INVENTORS:
Joseph P. Lawlor
and Hans C. Albertsen,

BY Davers, Sitton, Fallen & Lungmus,
ATTORNEYS.

United States Patent Office 2,926,856
Patented Mar. 1, 1960

2,926,856

VARIABLE FLOW REACTOR

Joseph P. Lawlor and Hans C. Albertsen, Ames, Iowa, assignors to General Filter Company, Ames, Iowa, a corporation of Iowa Application December 5, 1958, Serial No. 778,484

4 Claims. (Cl. 239—254)

This invention relates to a variable flow reactor for a rotary fluid distributing device. Such devices have particular utility in distributing sewerage water over the upper surface of a circular filter bed.

Rotary devices which are actuated by a reaction or a jet-type propulsion provide a mechanically simple mechanism for distributing sewerage water over filter beds. Such devices include a central rotating tower with two or more manifold arms extending outwardly therefrom in a balanced, symmetrical arrangement, the arms being supported from the tower for rotation therewith. In association with each of the manifold arms there is provided a plurality of reactors which are spaced along the arms. The reactors have two functions. They distribute the water over the surface of the filter bed and also provide the reaction propulsion which drives the radially-extending arms. The simultaneous accomplishment of both of these functions in a satisfactory manner has heretofore presented a problem. Code requirements and other applicable regulations specify that the water must be distributed uniformly over each square foot of surface on the filter bed. These requirements are difficult to meet since the available hydraulic head differs from reactor to reactor, the hydraulic head diminishing as the distance of the reactor from the central tower increases.

It is therefore an object of this invention to provide adjustable flow regulating means in combination with reactors for rotary fluid distributing devices. A related object is to provide a flow regulating means of the character described which is easy to install and inexpensive, while at the same time being functionally satisfactory. A further object is to provide a variable flow reactor wherein the flow regulating means is manually adjustable without the use of tools or other special equipment. Further objects and advantages will appear as the specification proceeds.

This invention is shown in an illustrative embodiment, in which—

Figure 1:
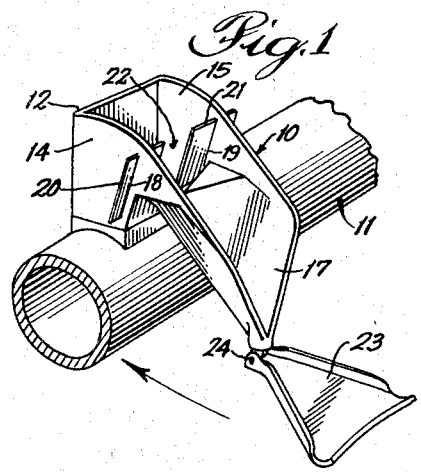
Figure 1 is a perspective view of a reactor embodying the novel flow regulating means of the present invention, the reactor being shown mounted on a portion of a manifold arm.
Figure 2:
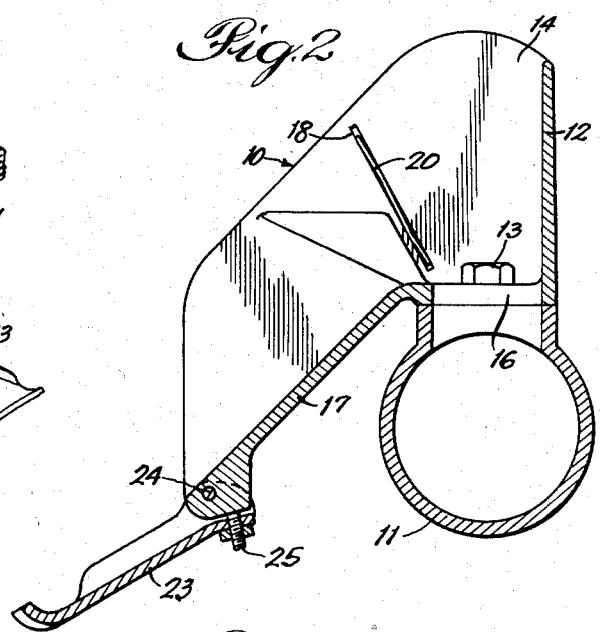
Figure 2 is a side sectional view of the reactor of Figure 1.

Looking first at Figures 1 and 2 there is shown a reactor 10 which is mounted on a manifold arm 11. As explained in greater detail in our copending application Serial No. 778,476 filed Dec. 5, 1958 entitled "Device for Distributing Sewerage Water Over an Outdoor Filter Bed," the reactor arm 11 extends outwardly from a central tower and is arranged to rotate over the surface of a filter bed. For example, the arm 11 would be driven by reaction propulsion in the direction indicated by the arrow in Figure 1 where the inner end of the manifold was to the right of the reactor as viewed in Figure 1.

Reactor 10 includes a weir box 12 which is adapted to be mounted on arm 11. In the illustration given, the box 12 is seated on top of the arm 11 and removably bolted thereto as indicated at 13 (Figure 2). It will be noted that weir box 12 has upwardly extending walls including oppositely disposed side walls 14 and 15. As shown in Figure 2, the bottom of the box provides an inlet port 16 which is arranged to communicate with the interior of manifold arm 11 so that sewerage water can flow from within arm 11 to within weir box 12.

As shown more clearly in Figure 1, the rear of box 12 is open for the outflow of fluid therefrom. Preferably, the top of the box is also open, as in the illustration given. A discharge spout 17 extends downwardly and outwardly from the rear of box 12 for receiving the fluid discharged from the box. The portions of the box side walls 14 and 15 which are adjacent the upper end of spout 17 are provided with oppositely disposed upwardly extending slots 18 and 19. Flexible, resilient plates 20 and 21 are respectively slidably received within the slots 18 and 19. As shown more clearly in Figure 1, the plates 20 and 21 have portions extending outwardly beyond the sides of the weir box as well as portions extending inwardly towards each other to provide an opening 22 therebetween. In the operation of the device, the size of opening 22 can be manually varied by grasping the outwardly projecting portions of the plates 20 and 21 to respectively shift the plates in the slots 18 and 19.

Reactor 10 also includes a spreader plate 23 which extends downwardly and outwardly from the lower end of spout 17, the upper end of the spreader plate being pivotally connected to the lower end of the spout as indicated at 24, and a setscrew 25 being provided for adjusting the inclination of plate 23. The importance of these features and further details with regard to the construction thereof are described in our copending application cited above.

Preferably, the components of reactor 10 are formed of corrosion resistant materials. For example, weir box 12 and spout 17 can be formed of a one piece aluminum casting, and spreader plate 23 can be formed of a separate aluminum casting. The weir plates 20 and 21 can be made from aluminum sheet stock, or other suitable materials.

Figure 3:
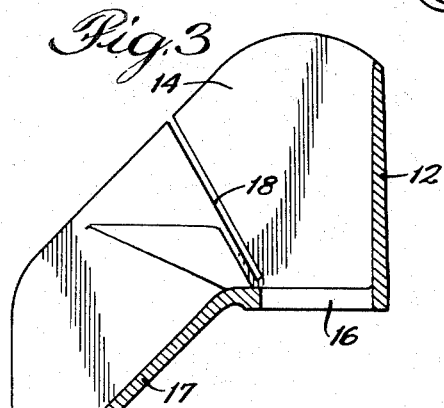
Figure 3 is a sectional view of one of the components of the reactor of Figures 1 and 2, the component being shown at one stage of its manufacture.
Figure 4:
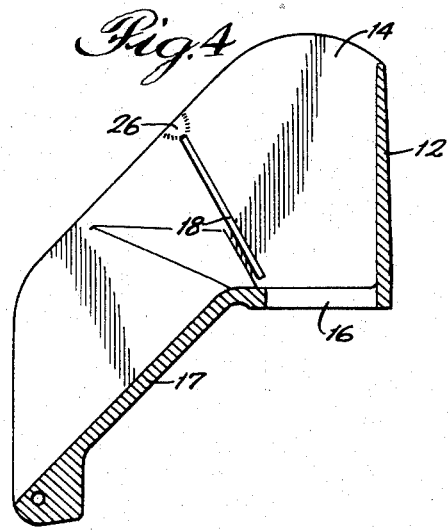
Figure 4 is a view similar to Figure 3 showing the same component at a later stage of its manufacture.
Figure 5:
Figure 5 is a side view of one of the adjustable weir plates which are preferably employed in the combination of Figures 1 and 2.

One procedure for assembling the weir plates and the weir box is illustrated in Figures 3 to 5. Looking first at Figure 3, there is shown an integral member consisting of the weir box 12 and the spout 17. The slots for receiving the weir plates, such as slot 18, can be formed by a sawing operation wherein slits are extended into the side walls of the box from the top thereof, as indicated in Figure 3. The upper ends of the slots are then closed by a plug of fused metal, such as the plug 26 as indicated in Figure 4. This can easily be accomplished by a welding operation. The closing of the upper end of the slots prevents the side walls of the weir box from being unduly weakened by the sawing operation, and provides slots having closed upper ends for receiving the weir plates. If desired, however, the bottom of the weir box may be reinforced and the tops of the slots left open.

In the illustration given, the slots 18 and 19 are formed so that they are slightly wider than the thickness of the sheet stock which is used for forming the weir plates. This relationship is indicated in Figure 2. The weir plates are provided with a non-planar distortion, as shown more clearly in Figure 5. The slight kinking or distorting of the weir plates, such as is illustrated for plate 20, permits the plates to be held securely in the slots at any selected position while permitting the position of the plates to be manually shifted. In this way, the size of the opening 22 can be readily varied, and thereby the flow rates from any given reactor can be adjusted and balanced with respect to the flow rates from all the other reactors to achieve a substantially uniform distribution of liquid over the surface of the filter bed.

While in the foregoing specification this invention has been described in relation to a specific embodiment thereof, it will be apparent to those skilled in the art that the invention is susceptible to other embodiments wherein certain of the details described herein may be varied without departing from the basic principles of the invention.

We claim:

1. In a variable flow reactor for a rotary fluid distributing device, the combination comprising a weir box adapted to be mounted on a manifold arm for movement in a forward direction, said weir box having upwardly extending walls including oppositely disposed side walls and providing an inlet port arranged for communication with the interior of said manifold arm, the rear of said box being open for the outflow of fluid therefrom, a discharge spout extending downwardly and outwardly from the rear of said box for receiving the fluid as discharged from said box, the portions of the side walls of said box adjacent the upper end of said spout providing oppositely disposed, upwardly extending slots, and a plate slidably received within each of said slots, said plates having portions extending outwardly beyond said sides as well as portions extending inwardly towards each other to provide an opening therebetween the size of which can be manually varied.

2. The combination of claim 1 which is characterized by the further fact that said plates are thinner than said slots and have a non-planar distortion therein for causing said plates to be held securely in said slots in a selected position while permitting the position of said plates to be manually shifted.

3. The combination of claim 1 wherein the upper ends of said slots are closed by plugs of fused metal.

4. In a variable flow reactor for a rotary fluid distributing device, the combination comprising a weir box adapted to be mounted on a rotating radially-extending manifold arm for movement in a forward direction, said weir box having upwardly extending walls including oppositely disposed side walls and providing an inlet port arranged for communication with the interior of said manifold arm, the rear of said box being open for the outflow of fluid therefrom, a discharge spout extending downwardly and outwardly from the rear of said box for receiving the fluid discharged from said box, the portions of the side walls of said box adjacent the upper end of said spout providing oppositely disposed upwardly extending slots, the upper ends of said slots being closed by plugs of fused metal, and a flexible, resilient plate slidably receivide with in each of said slots, said slots being wider than the thickness of said plates and said plates having a non-planar distortion therein for causing said plates to be held securely in said slots, said plates having portions extending outwardly beyond the sides of said weir box as well as portions extending inwardly toward each other to provide an opening therebetween the size of which can be manually varied by grasping the outwardly projecting portions of said plates to shift said plates in said slots.

References Cited in the file of this patent

UNITED STATES PATENTS

| | | |
|---|---|---|
| 2,225,836 | Lund | Dec. 24, 1940 |
| 2,333,177 | Hodges | Nov. 2, 1943 |
| 2,403,695 | Walker | July 9, 1946 |